(12) United States Patent
O'Hare

(10) Patent No.: US 12,743,009 B2
(45) Date of Patent: Sep. 22, 2026

(54) APPARATUS FOR PHOTOGRAPHING ANIMALS

(71) Applicant: Kathryn G. O'Hare, San Diego, CA (US)

(72) Inventor: Kathryn G. O'Hare, San Diego, CA (US)

( * ) Notice: Subject to any disclaimer, the term of this patent is extended or adjusted under 35 U.S.C. 154(b) by 138 days.

(21) Appl. No.: 18/782,275

(22) Filed: Jul. 24, 2024

(65) Prior Publication Data

US 2026/0029695 A1 Jan. 29, 2026

(51) Int. Cl.
*G03B 17/56* (2021.01)

(52) U.S. Cl.
CPC ......... *G03B 17/563* (2013.01); *G03B 17/561* (2013.01); *G03B 17/566* (2013.01)

(58) Field of Classification Search
None
See application file for complete search history.

(56) References Cited

U.S. PATENT DOCUMENTS

| | | | | |
|---|---|---|---|---|
| 2,599,269 A * | 6/1952 | Markle | F16M 11/2064 248/404 |
| 9,170,473 B1 * | 10/2015 | Li | G03B 17/563 |
| 2007/0119384 A1 * | 5/2007 | Ritchey | A01K 15/025 119/708 |
| 2007/0172223 A1 * | 7/2007 | Eberhardt | G03B 17/561 396/281 |
| 2019/0258142 A1 * | 8/2019 | Liu | H05K 1/18 |
| 2020/0297205 A1 * | 9/2020 | Hill | A61B 1/24 |

FOREIGN PATENT DOCUMENTS

| | | | |
|---|---|---|---|
| CN | 205545477 U * | 8/2016 | |
| CN | 206005528 U * | 3/2017 | |
| CN | 212156449 U * | 12/2020 | |
| CN | 217441321 U * | 9/2022 | |
| CN | 217884773 U * | 11/2022 | |
| KR | 20180130902 A * | 12/2018 | A63H 3/50 |
| KR | 20240020486 A * | 2/2024 | G01B 11/16 |
| WO | WO-2018094045 A2 * | 5/2018 | H04N 13/344 |

* cited by examiner

*Primary Examiner* — Rodney E Fuller

(57) ABSTRACT

A camera stick apparatus for holding an object such as an animal toy in the field of view of a camera is described. In one embodiment the camera stick is has an upper stick portion and a lower stick portion coupled to a phone clamp, the phone clamp is adapted to cradle a phone having a phone camera. An attachment arm coupled with the camera stick portion of the camera sick has a first coupling portion, the first coupling portion may be adapted to couple with a second coupling portion of an apparatus adapted to hold an object such as the animal toy substantially in the field of view of the camera.

11 Claims, 4 Drawing Sheets

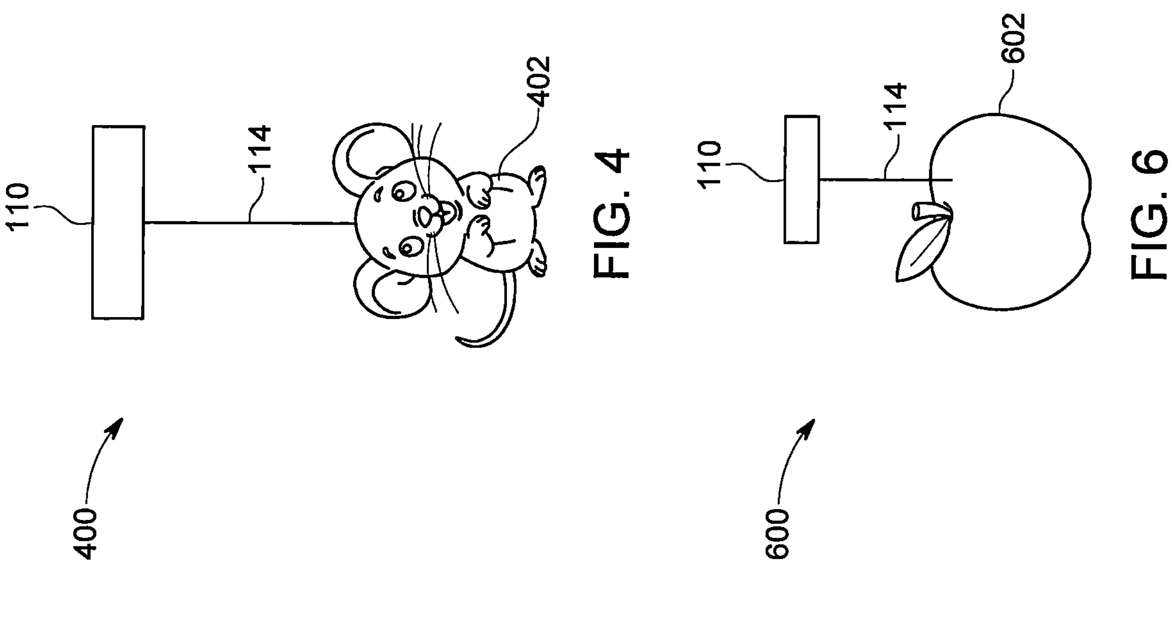
400
110
114
402
FIG. 4
600
110
114
602
FIG. 6
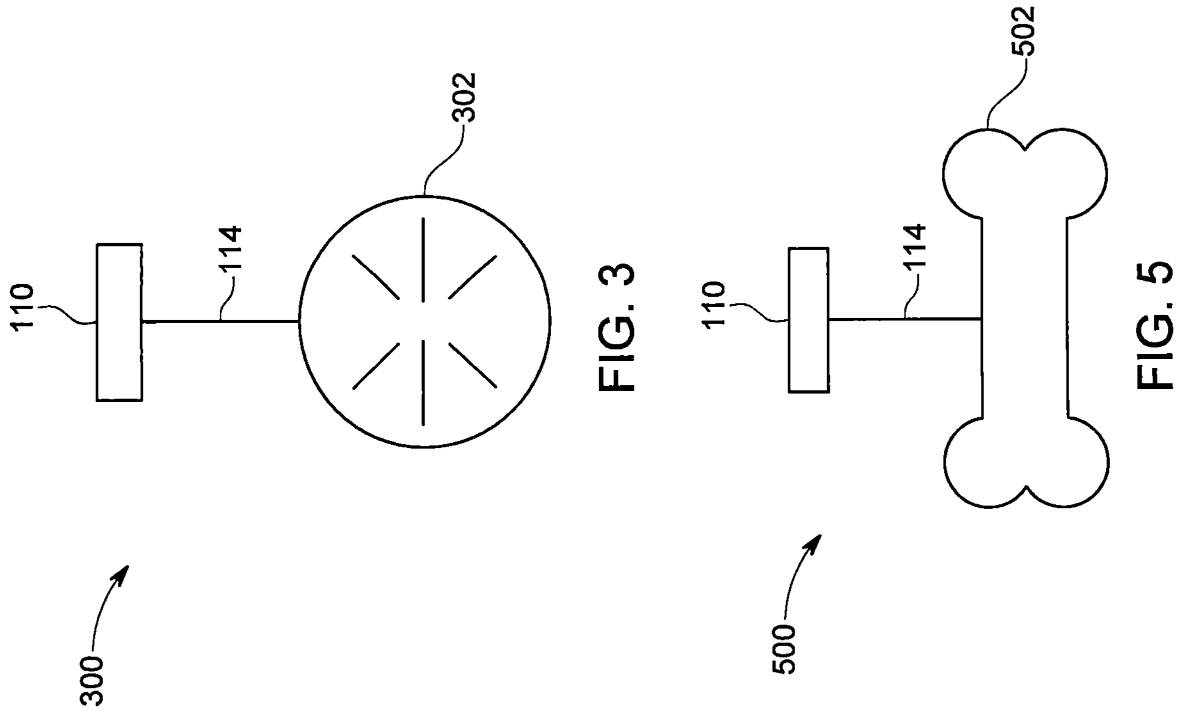
300
110
114
302
FIG. 3
500
110
114
502
FIG. 5

APPARATUS FOR PHOTOGRAPHING ANIMALS

FIELD

This disclosure is directed to camera sticks. More specifically, this disclosure is directed to camera sticks for photographing animals.

DESCRIPTION OF RELATED ART

Photographers of animals often have an assistant entertain or otherwise engage an animal so that the photographer may shoot a picture or film the animal at play. This requires the photographer and the assistant to work closely together. One of the difficulties is that the assistant must make sure that the animal is in the field of view of the camera. Moreover, the assistant must take care that he or she is not in the field of view with the animal. This requires very close coordination and is difficult to execute consistently and effectively.

Cat photographers, for example, will often have an assistant use a wand with a cat toy attached to the wand with a string. The assistant can move the wand and the cat toy will move. Cats will often begin to play with the moving toy. The photographer can then take a picture of the cat at play. Notably, effectively taking a picture requires two people and very close coordination.

What is needed in the art is an apparatus that will allow a photographer to take a picture of animal at play without the need for an assistant or close coordination. An apparatus that makes it easy to ensure that they toy is in a field of view of the camera is also needed.

SUMMARY

In one exemplary embodiment an apparatus has a camera stick with the camera stick coupled to a phone cradle. The phone cradle may be adapted to cradle a phone having a phone camera capable of taking pictures or movies. An attachment arm may be coupled with the camera stick and adapted to attach with an apparatus for holding an object such as an animal toy. The apparatus for holding an object may hold the object such that a large portion of the object is in a field of view of the camera. Using this exemplary embodiment a photographer may easily photograph a cat or other animal at play by engaging the animal using the object.

BRIEF DESCRIPTION OF THE DRAWINGS

A better understanding of the present subject matter can be obtained when the following detailed description of various embodiments is considered in conjunction with the following drawings, in which:

FIG. 3 shows an animal toy apparatus according to an exemplary embodiment of the invention FIG. 4 shows an animal toy apparatus according to another exemplary embodiment of the invention.

FIG. 5 shows an animal toy apparatus according to yet another exemplary embodiment of the invention.

FIG. 6 shows an animal toy apparatus according to still another exemplary embodiment of the invention.

DETAILED DESCRIPTION

Figure 1:
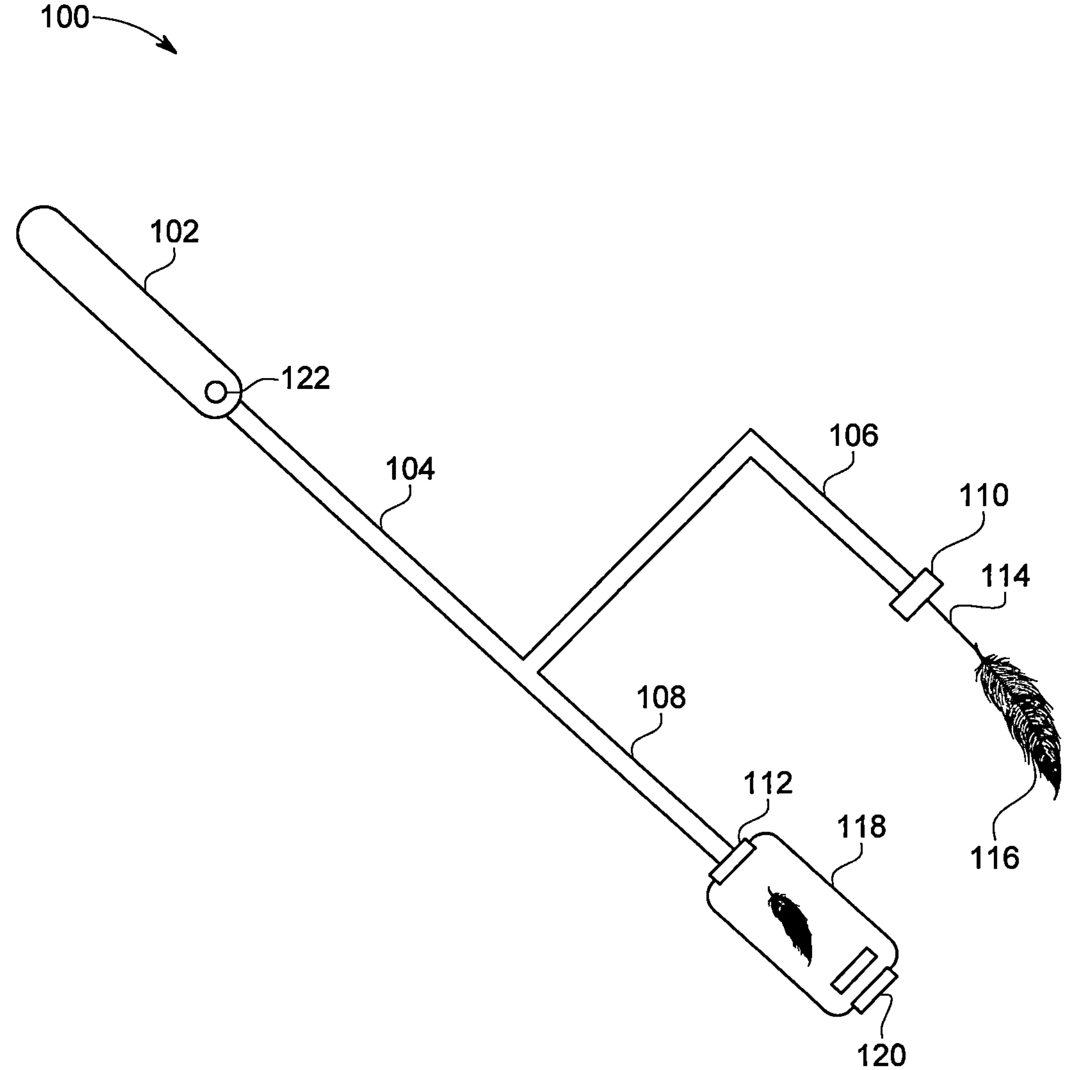
FIG. 1 shows a camera stick apparatus according to a first exemplary embodiment of the invention.

While the features described herein may be susceptible to various modifications and alternative forms, specific embodiments thereof are shown by way of example in the drawings and are herein described in detail. It should be understood, however, that the drawings and detailed description thereto are not intended to be limiting to the form disclosed. On the contrary, the intention is to cover modifications, equivalents and alternatives falling within the spirit and scope of the subject matter as defined by the appended claims.

FIG. 1 shows a camera stick apparatus 100 according to a first exemplary embodiment of the invention. The camera stick apparatus 100 may be comprised of a handle 102 connected to an upper camera stick portion 104. The upper camera stick portion 104 may be coupled to an attachment arm 106 and a lower camera stick portion 108. The upper camera stick portion 104 and the lower camera stick portion 108 together may be referred to as the camera stick. The attachment arm 106 may have a coupling portion 110. The coupling portion 110 may be adapted to couple a string 114 or other object to the attachment arm 106. In this embodiment, the attachment has an L shape. The string 114 may in turn be attached to an animal toy such as a feather 116. The lower camera stick portion 108 may be connected to a cradle having a proximal phone attachment 112 and a distal phone attachment 120. The proximal phone attachment portion 112 and distal phone attachment 120 of a phone clamp may be adapted to hold or cradle a phone 118. The handle may have a button 122 that may wirelessly connect to the phone. 118. Alternatively, the button may have a wired connection to the phone 118.

In one exemplary embodiment, the handle 102 may be made of rubber, plastic, foam or any other suitable material. In another embodiment the upper camera stick portion 104 and the lower camera stick portion 108 may be made of stainless steel, aluminum alloy, plastic or other suitable material. The attachment arm 106 in various embodiments may be rigidly attached to the upper camera stick portion 104 or the lower camera stick portion 108. In various embodiments, the attachment may be made of the same material as the upper camera stick portion 104 and the lower camera stick portion 108. In an exemplary embodiment the upper camera stick portion 104, the lower camera stick portion 108 and the attachment arm 106 are fabricated of a single piece of material such as aluminum alloy for example. In other embodiments, the upper camera stick portion 104 and the lower camera stick portion 108 may be fabricated as a single piece of aluminum alloy with the attachment arm 106 fabricated separately and coupled to the upper camera stick portion 104 or the lower camera stick portion 108 with a suitable joint, fastener or other coupling means. A removable attachment arm 106 is also contemplated. In some embodiments, portions of the camera stick 104, 108 may be telescoping allowing a user to change the length of the camera stick.

The proximal phone attachment portion 112 and distal phone attachment portion 120 may be portions of a phone clamp for example. In one exemplary embodiment, the phone clamp may have a screw (not shown) allowing a user to clamp in the phone 118 with the proximal attachment portion 112 and the distal phone attachment 120 securely cradling or holding the phone in the clamp. The phone 118 cradled in the phone clamp may have a field of view near the coupling portion 110 of the attachment arm 106. As shown in FIG. 1, the phone 118 may be oriented to allow it to photograph an object coupled to the attachment arm 206 such as feather 116. In various embodiments, the phone clamp may be mounted to the lower camera stick portion 108 with a joint that allows a user to orient the phone to a desired field of view.

The button 122 may be operable to communicatively connect with the phone 118. Pushing the button 122 may allow a photographer to command the phone 118 to take a picture or a movie. In alternative embodiments, the button 122 may communicate with the phone through a wired connection. Similarly, the photographer may use button 122 with a wired connection to command the phone 118 to take a picture.

Figure 2:
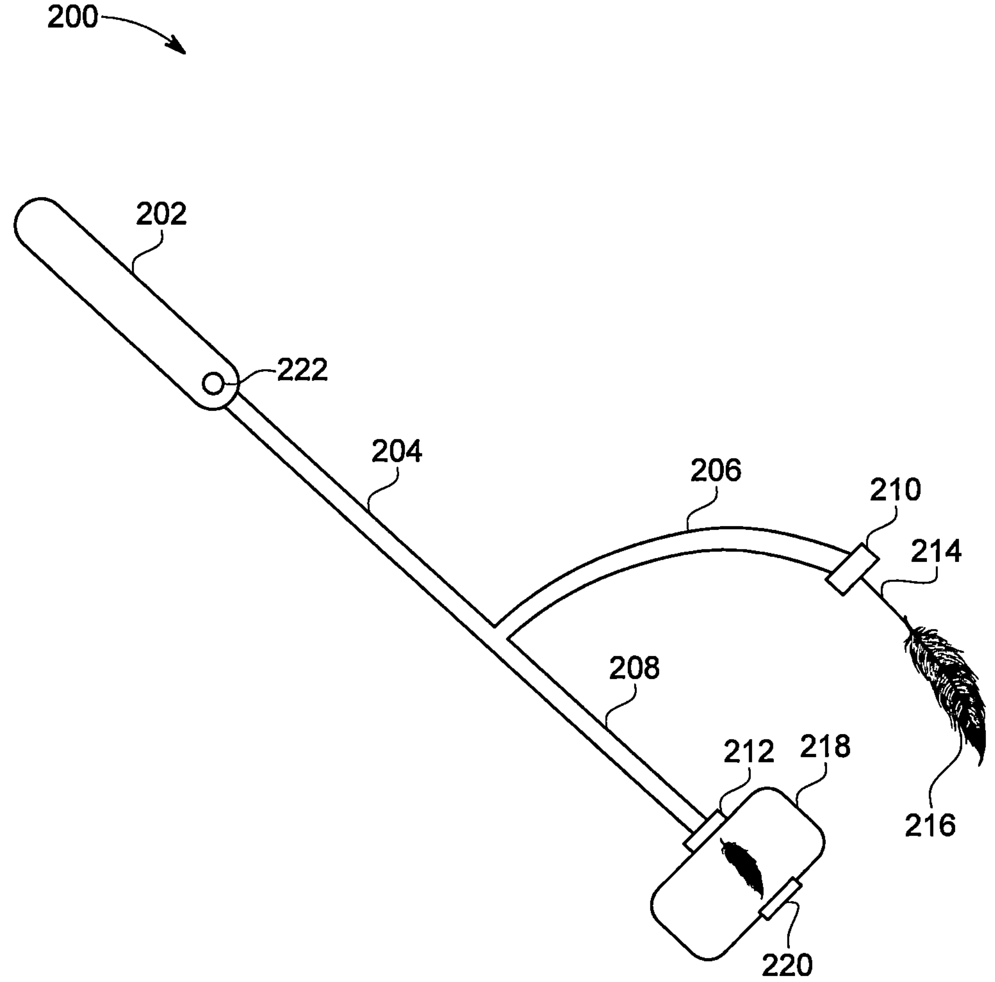
FIG. 2 shows a camera stick apparatus according to a second exemplary embodiment of the invention.

FIG. 2 shows a camera stick apparatus 200 according to a second exemplary embodiment of the invention. The camera stick apparatus 200 is comprised of a handle 202 connected to an upper camera stick portion 204. The upper camera stick portion is coupled to an attachment arm 206 and a lower camera stick portion 208. The upper camera stick portion 204 and the lower camera stick portion 208 together may be referred to as the camera stick. The attachment arm 206 has a coupling portion 210. The coupling portion 210 is adapted to couple a string 214 or other object to the attachment arm 206. In this embodiment, the attachment arm 206 has a curved shape. The string 214 may be in turn attached to an animal toy such as a feather 116. The lower camera stick portion 208 may be connected to a cradle having a proximal phone attachment 212 and a distal phone attachment 220. The proximal phone attachment portion 212 and distal phone attachment 120 of the cradle are adapted to hold or cradle a phone 218. The handle may have a button 222 wirelessly or wired to the phone 218.

In one exemplary embodiment, the handle 202 may be made of rubber, plastic, foam or any other suitable material. In another embodiment the upper camera stick portion 204 and the lower camera stick portion 208 may be made of stainless steel, aluminum alloy, plastic or other suitable material. The attachment arm 206 in various embodiment may be rigidly attached to the upper camera stick portion 204. In various embodiments, the attachment may be made of the same material as the upper camera stick portion 204 and the lower camera stick portion 208. In an exemplary embodiment the upper camera stick portion 204, the lower camera stick portion 208 and the attachment arm 206 are fabricated as a single piece of material such as aluminum alloy for example. In other embodiments, the upper camera stick portion stick portion 204 and the lower camera stick portion 208 may be fabricated as a single piece of aluminum alloy with the attachment arm 206 fabricated separately and coupled to the upper camera stick portion 204 or the lower camera stick portion 208 with a suitable joint, fastener or other coupling means. A removable attachment arm 206 is also contemplated. In some embodiments, portions of the camera stick 204, 208 may be telescoping allowing a user to change the length of the camera stick.

The proximal phone attachment portion 212 and distal phone attachment portion 220 may be portions a phone clamp for example. In one exemplary embodiment, the phone clamp may have a screw (not shown) allowing a user to clamp in the phone 218 with the proximal attachment portion 212 and the distal phone attachment 220 securely cradling or holding the phone 218 in the clamp. The phone 218 cradled in the phone clamp may have a field of view near the coupling portion 210 of the attachment arm 206. As shown in FIG. 2, the phone 218 may be oriented to allow it to photograph an object coupled to the attachment arm 206 such as feather 216. In various embodiments, the phone clamp may be mounted to the lower camera stick 206 with a joint that allows a user to orient the phone to a desired field of view.

The button 222 may be operable to communicatively connect with the phone 218. Pushing the button 222 may allow a photographer to command the phone 222 to take a picture. In alternative embodiments the button 222 may communicate with the phone through a wired connection. Similarly, the photographer may use button 222 with a wired connection to command the phone 218 to take a picture.

FIG. 3 shows an animal toy apparatus 300 according to an exemplary embodiment of the invention. The animal toy apparatus 300 has a coupling portion 110, 210 connected to a string 114, 214, in turn, connected to an illuminate-able sphere 302. The illuminate-able sphere 302 may be a cat toy for example.

In this embodiment, the illuminated sphere 302 is attached to string 114, 214. In alternate embodiments the illuminated sphere 302 may be rigidly attached to coupling portion 110, 210. An embodiment wherein the illuminated sphere is connected wirelessly or via wire with button 122, 122 and or phone 118, 218 is also contemplated.

FIG. 4 shows an animal toy apparatus 400 according to another exemplary embodiment of the invention. The animal toy apparatus 400 has a coupling portion 110, 210 connected to a string 114, 214 in turn connected to a toy mouse 402. The toy mouse 402 may be a toy for a cat for example.

In this embodiment, the toy mouse 402 is attached to string 114, 214. In alternate embodiments the toy mouse 402 is rigidly attached to coupling portion 110, 210.

FIG. 5 shows an animal toy apparatus 500 according to yet another exemplary embodiment of the invention. The animal toy apparatus 500 has a coupling portion 110, 210 connected to a string 114, 214 in turn connected to a bone toy 502. The bone toy 502 may be a toy for a dog for example.

In this embodiment, the bone toy 502 is attached to string 114, 214. In alternate embodiments the bone toy 502 may be rigidly attached to coupling portion 110, 210.

FIG. 6 shows an animal toy apparatus 600 according to still another exemplary embodiment of the invention. The animal toy apparatus 600 has a coupling portion 110 connected to a string 114 in turn connected to an apple 602. The apple 602 may be a toy (or a lure) for a horse for example 602. The edible apple may be considered another toy for an animal.

Figure 7:
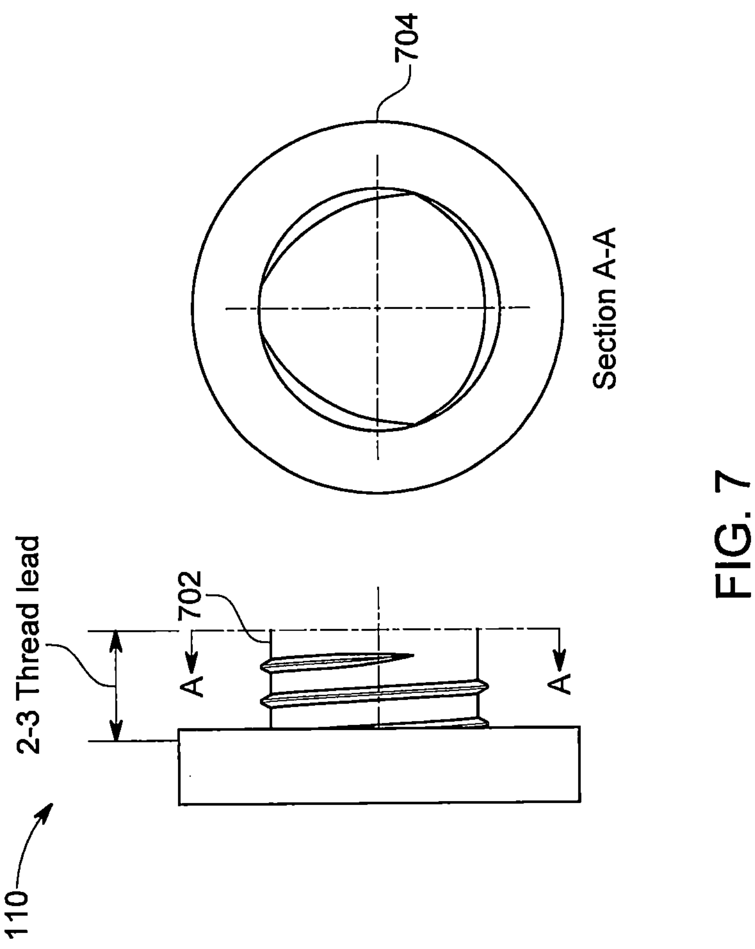
FIG. 7 shows a coupling portion according to an exemplary embodiment of the invention.

FIG. 7 shows a coupling portion 110, 210 according to an exemplary embodiment of the invention. The coupling portion 110, 210 may be comprised of a coupling portion of an animal toy apparatus for example. The coupling portion may be comprised of a first coupling portion 702 that may be threaded. The first coupling portion may have a screw receptacle 704, for example. The screw receptacle 704 may be attached to attachment arm 106, 206. The screw receptacle may be adapted to mate with screw 702. The screw 702 may be part of an animal toy apparatus for example. Screw 704 attached to attachment arm 106, 206 and screw 702 may be used to attach and detach the animal toy apparatus from the camera stick apparatus.

Figure 8:
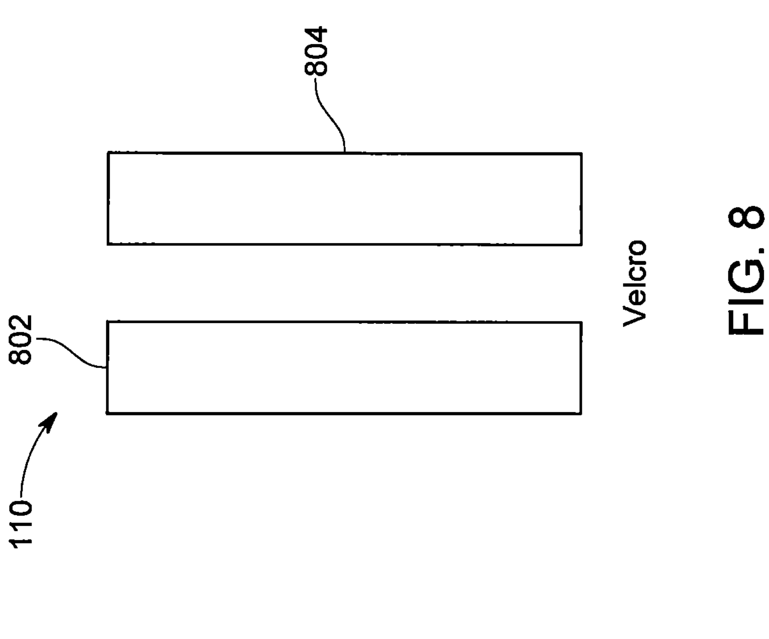
FIG. 8 shows a coupling portion according to an exemplary embodiment of the invention.

FIG. 8 shows a coupling portion 110, 210 according to an exemplary embodiment of the invention. The coupling portion 110, 210 may have a first coupling portion 802 of an animal toy apparatus that is made of a hook-and-loop fastening system. The coupling portion 110 may also have a second coupling portion 804 that is adapted to mate with the first coupling portion 802.

Although the embodiments above have been described in considerable detail, numerous variations and modifications will become apparent to those skilled in the art once the above disclosure is fully appreciated. It is intended that the following claims be interpreted to embrace all such variations and modifications.

What is claims is:

1. A camera stick apparatus comprising:

a camera stick having an upper portion and a lower portion defining a longitudinal axis;

a phone clamp coupled to the lower portion of the camera stick, the phone clamp configured to hold a mobile phone having a camera, the camera defining a camera optical axis when the mobile phone is positioned in the phone clamp and an attachment arm rigidly coupled to the camera stick and extending laterally relative to the longitudinal axis, the attachment arm including a coupling portion configured to removably couple to an object-holding apparatus;

wherein the coupling portion is positioned at a fixed lateral offset from the camera optical axis such that an object coupled to the coupling portion is disposed within a predetermined region of a field of view of the camera during operation of the camera stick apparatus and wherein the attachment arm is substantially curved.

2. A camera stick apparatus comprising:

a camera stick having an upper portion and a lower portion defining a longitudinal axis;

a phone clamp coupled to the lower portion of the camera stick, the phone clamp configured to hold a mobile phone having a camera, the camera defining a camera optical axis when the mobile phone is positioned in the phone clamp and an attachment arm rigidly coupled to the camera stick and extending laterally relative to the longitudinal axis, the attachment arm including a coupling portion configured to removably couple to an object-holding apparatus;

wherein the coupling portion is positioned at a fixed lateral offset from the camera optical axis such that an object coupled to the coupling portion is disposed within a predetermined region of a field of view of the camera during operation of the camera stick apparatus and wherein the coupling portion comprises a threaded receptacle configured to receive a mating screw of an animal toy apparatus.

3. A camera stick apparatus comprising:

a camera stick having an upper portion and a lower portion defining a longitudinal axis;

a phone clamp coupled to the lower portion of the camera stick, the phone clamp configured to hold a mobile phone having a camera, the camera defining a camera optical axis when the mobile phone is positioned in the phone clamp and an attachment arm rigidly coupled to the camera stick and extending laterally relative to the longitudinal axis, the attachment arm including a coupling portion configured to removably couple to an object-holding apparatus;

wherein the coupling portion is positioned at a fixed lateral offset from the camera optical axis such that an object coupled to the coupling portion is disposed within a predetermined region of a field of view of the camera during operation of the camera stick apparatus and wherein the attachment arm is resiliently flexible such that the object is movable within the predetermined region of the camera field of view while maintaining attachment to the coupling portion.

4. A camera stick apparatus comprising:

a camera stick extending along a longitudinal axis;

a handle coupled to the camera stick, the handle including a control button configured to wirelessly transmit a capture command to a mobile phone;

a phone clamp mounted to the camera stick and configured to hold the mobile phone having a camera;

an attachment arm coupled to the camera stick and extending outward from the camera stick in a direction transverse to the longitudinal axis; and the attachment arm including a distal coupling interface configured to removably attach an animal toy, wherein the distal coupling interface is positioned at a fixed spatial location relative to a camera optical axis of the mobile phone such that the animal toy is maintained within a predetermined region of a field of view of the camera during simultaneous movement of the camera stick and the animal toy.

5. The camera stick apparatus of claim 4 wherein the coupling interface comprises a threaded screw interface.

6. The camera stick apparatus of claim 4 wherein the control button communicates wirelessly with the mobile phone.

7. The camera stick apparatus of claim 4 wherein the attachment arm is substantially L shaped.

8. The camera stick apparatus of claim 4 wherein the attachment arm is substantially curved.

9. The camera stick of claim 4 wherein the attachment arm is flexible to permit positional variation of the animal toy within the field of view.

10. The camera stick apparatus of claim 4 wherein the attachment arm is rigid.

11. The camera stick apparatus of claim 4 wherein the coupling interface comprises a hook-and-loop fastening system.

* * * * *